United States Patent
Jeong (10) Patent No.: US 7,248,663 B2
(45) Date of Patent: Jul. 24, 2007

(54) APPARATUS AND METHOD FOR TRANSFORMING DATA TRANSMISSION SPEED

(75) Inventor: Yun-Jun Jeong, Gunpo-shi (KR)

(73) Assignee: LG Nortel Co., Ltd., Seoul (KR)

( * ) Notice: Subject to any disclaimer, the term of this patent is extended or adjusted under 35 U.S.C. 154(b) by 879 days.

(21) Appl. No.: 10/212,163

(22) Filed: Aug. 6, 2002

(65) Prior Publication Data

US 2003/0033456 A1    Feb. 13, 2003

(30) Foreign Application Priority Data

Aug. 8, 2001  (KR) ............................... 2001-47796

(51) Int. Cl.
*H04L 7/00* (2006.01)
(52) U.S. Cl. .................................................... 375/372
(58) Field of Classification Search ................ 375/372, 375/240, 240.26
See application file for complete search history.

(56) References Cited

U.S. PATENT DOCUMENTS

| | | | | |
|---|---|---|---|---|
| 4,791,660 A | * | 12/1988 | Oye et al. ................... | 379/88.1 |
| 4,953,180 A | * | 8/1990 | Fieschi et al. ............... | 375/219 |
| 5,394,399 A | * | 2/1995 | Kawasaki et al. ........... | 370/545 |
| 5,438,569 A | * | 8/1995 | Kapadia et al. ............. | 370/463 |
| 6,748,020 B1 | * | 6/2004 | Eifrig et al. ............. | 375/240.26 |
| 2002/0196853 A1 | * | 12/2002 | Liang et al. ........... | 375/240.16 |

\* cited by examiner

*Primary Examiner*—Temesghen Ghebretinsae
*Assistant Examiner*—Juan Alberto Torres
(74) *Attorney, Agent, or Firm*—Ked & Associates, LLP (57) ABSTRACT

Disclosed is an apparatus and method for transforming data transmission speed that transforms data transmission speeds of data transmitting apparatuses that have different data transmission speeds using a DPRAM. By using a DPRAM to transform transmission speeds, the apparatus and method for transforming data transmission speed is simplified, thereby improving the procedure for transforming data transmission speed. Furthermore, it is possible to prevent data from being lost at the time of transforming data transmission speed.

20 Claims, 5 Drawing Sheets

APPARATUS AND METHOD FOR TRANSFORMING DATA TRANSMISSION SPEED

BACKGROUND OF THE INVENTION

1. Field of the Invention

The present invention relates to an apparatus for transforming data transmission speed, and more particularly to an apparatus that transforms data transmission speed using a Dual Port Random Access Memory (DPRAM).

2. Background of the Related Art

Figure 1:
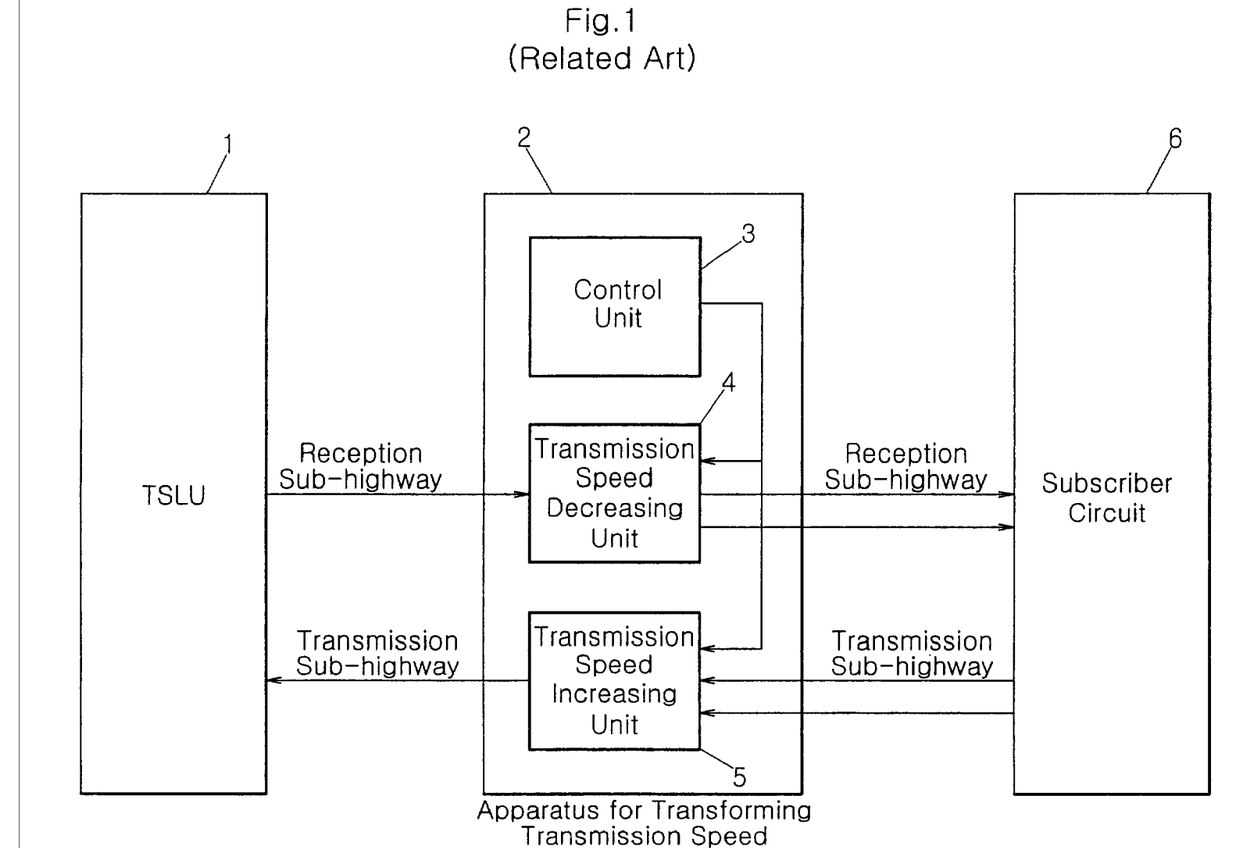
FIG. 1 is a block diagram that illustrates the related art apparatus for transforming data transmission speed.

Referring to FIG. 1, a related art apparatus for transforming data transmission speed includes a control unit 3, a transmission speed decreasing unit 4, and a transmission speed increasing unit 5.

The control unit 3 generates a number of control signals in order to control the operation of the transmission speed decreasing unit 4 and the transmission speed increasing unit 5.

The transmission speed decreasing unit 4, according to control of the control unit 3, receives data of the first transmission speed supplied from a Time Switch Line Unit (TSLU) 1 through a reception sub-highway. It then transforms the data of the first transmission speed by decreasing the transmission speed, and transmits the relevant transformed data of the second transmission speed through two reception sub-highways to a subscriber circuit 6.

The transmission speed increasing unit 5, according to control of the control unit 3, receives data of the second transmission speed supplied from the subscriber circuit 6 through two transmission sub-highways. It then transforms the data of the second transmission speed by increasing the transmission speed, and transmits the relevant transformed data of the first transmission speed through the transmission sub-highway to the TSLU 1.

The control unit 3, the transmission speed decreasing unit 4, and the transmission speed increasing unit 5 include internal logical circuits. The control unit 3 generates control signals in order to transform transmission speed. The transmission speed decreasing unit 4 and the transmission speed increasing unit 5 receive the relevant control signal from the control unit 3 and transform the data transmission speed using the internal logical circuits.

Specifically, the transmission speed decreasing unit 4 decreases a transmission speed of the data supplied through the reception sub-highway according to the control signal received from the control unit 3, and the transmission speed increasing unit 5 increases the transmission speed of the data supplied through the transmission sub-highway according to the control signal received from the control unit 3.

The related art apparatus for transferring data transmission speed has various problems. For example, as described above, the related art apparatus for transforming data transmission speed is implemented using a number of logical circuit elements. It is thus complicated to build the overall circuits. Accordingly, there exist various factors causing instability in the data whose transmission speed was transformed, due to malfunction or errors in the relevant logical circuit elements.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus for transforming data transmission speeds that is relatively simple to implement.

It is another object of the present invention to make the procedure of transforming data transmission speeds simpler by making it possible to transform the data transmission speeds of data transmitting apparatuses having different transmission speeds using a DPRAM.

It is another object of the present invention to prevent data from being lost at the time of transforming data transmission speed by implementing an apparatus for transforming data transmission speed using a DPRAM.

In order to achieve at least the above objects in whole or in parts, there is provided an apparatus for transforming data transmission speed, including a transmission speed transforming circuit unit that receives data of the first transmission speed, through the frame synchronizing signal of the relevant data bus of the first transmission speed by synchronizing the clock with the reference clock of the data bus of the first transmission speed, stores the received data at the DPRAM and, then, reads the stored data and transmits the data with the second transmission speed through frame synchronizing signal of the relevant data bus of the second transmission speed by synchronizing the clock with the reference clock of the data bus of the second transmission speed.

In order to achieve at least the above objects in whole or in parts, there is further provided a data reception unit of the first transmission speed that receives data of the first transmission speed through the frame synchronizing signal of the data bus of the first transmission speed by synchronizing the clock of the data reception unit of the first transmission speed with the reference clock of the data bus of the first transmission speed; a data transmission unit of the second transmission speed that transmits data of the second transmission speed through the frame synchronizing signal of the data bus of the second transmission speed by synchronizing the clock of the data transmission unit of the second transmission speed with the reference clock of the data bus of the second transmission speed; a DPRAM that stores the data of the first transmission speed and the data of the second transmission speed; an address control unit that generates control signals in order to write the data of the first transmission speed in the DPRAM or read the data of the second transmission speed from the DPRAM; a reception address generation unit that generates addresses for writing the data of the first transmission speed in the DPRAM according to the control signal of the address control unit; a reception data generation unit that transforms the data of the first transmission speed into data to be written in the DPRAM; a transmission address generation unit that generates addresses for reading the data of the second transmission speed from the DPRAM according to control signal of the address control unit; and a transmission data generation unit that transforms the data of the second transmission speed into data to be transmitted through the data transmission unit of the second transmission speed.

In order to achieve at least the above objects in whole or in parts, there is further provided an apparatus for transforming data transmission speed including a transmission speed transforming circuit unit that receives and stores data of the first transmission speed through the frame synchronizing signal of the relevant data bus of the first transmission speed by synchronizing the clock with the reference clock of the data bus of the first transmission speed and reads and transmits data of the second transmission speed through the frame synchronizing signal of the relevant data bus of the second transmission speed by synchronizing the clock with the reference clock of the data bus of the second transmission speed; and a DPRAM that stores the data of the first transmission speed according to control of the transmission speed transforming circuit unit and then outputs the data of the second transmission speed according to the control of the transmission speed transforming circuit unit.

In order to achieve at least the above objects in whole or in parts, there is further provided an apparatus for transforming data transmission speed including a data reception unit of the first transmission speed that receives data of the first transmission speed through the frame synchronizing signal of the relevant data bus of the first transmission speed by synchronizing the clock with the reference clock of the data bus of the first transmission speed; a data transmission unit of the second transmission speed that transmits data of the second transmission speed through the frame synchronizing signal of the data bus of the second transmission speed by synchronizing the clock with the reference clock of the data bus of the second transmission speed; a DPRAM that stores the data of the first transmission speed and the data of the second transmission speed; an address control unit that generates control signals in order to write the data of the first transmission speed in the DPRAM and read the data of the second transmission speed from the DPRAM; a reception address generation unit that generates addresses for writing the data of the first transmission speed in the DPRAM according to the control signal of the address control unit; a reception data generation unit that transforms the data of the first transmission speed into data to be written in the DPRAM; a transmission address generation unit that generates addresses for reading data of the second transmission speed from the DPRAM according to the control signal of the address control unit; and a transmission data generation unit that transforms the data of the second transmission speed into data to be transmitted through the data transmission unit of the second transmission speed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Hereinafter, a detailed description of the preferred embodiments of the present invention will be given with references to the accompanying drawings.

The apparatus for transforming data transmission speed of data transmitting apparatuses that have different transmission speeds according to the preferred embodiment of present invention preferably includes a reference clock, a frame synchronizing signal that indicates the start of a frame, transmission data, and reception data. The transmission of data according to the preferred embodiment is preferably conducted by sending or receiving the relevant data through the relevant frame synchronizing signal by synchronizing the clock of the relevant apparatus with the relevant reference clock.

Figure 2:
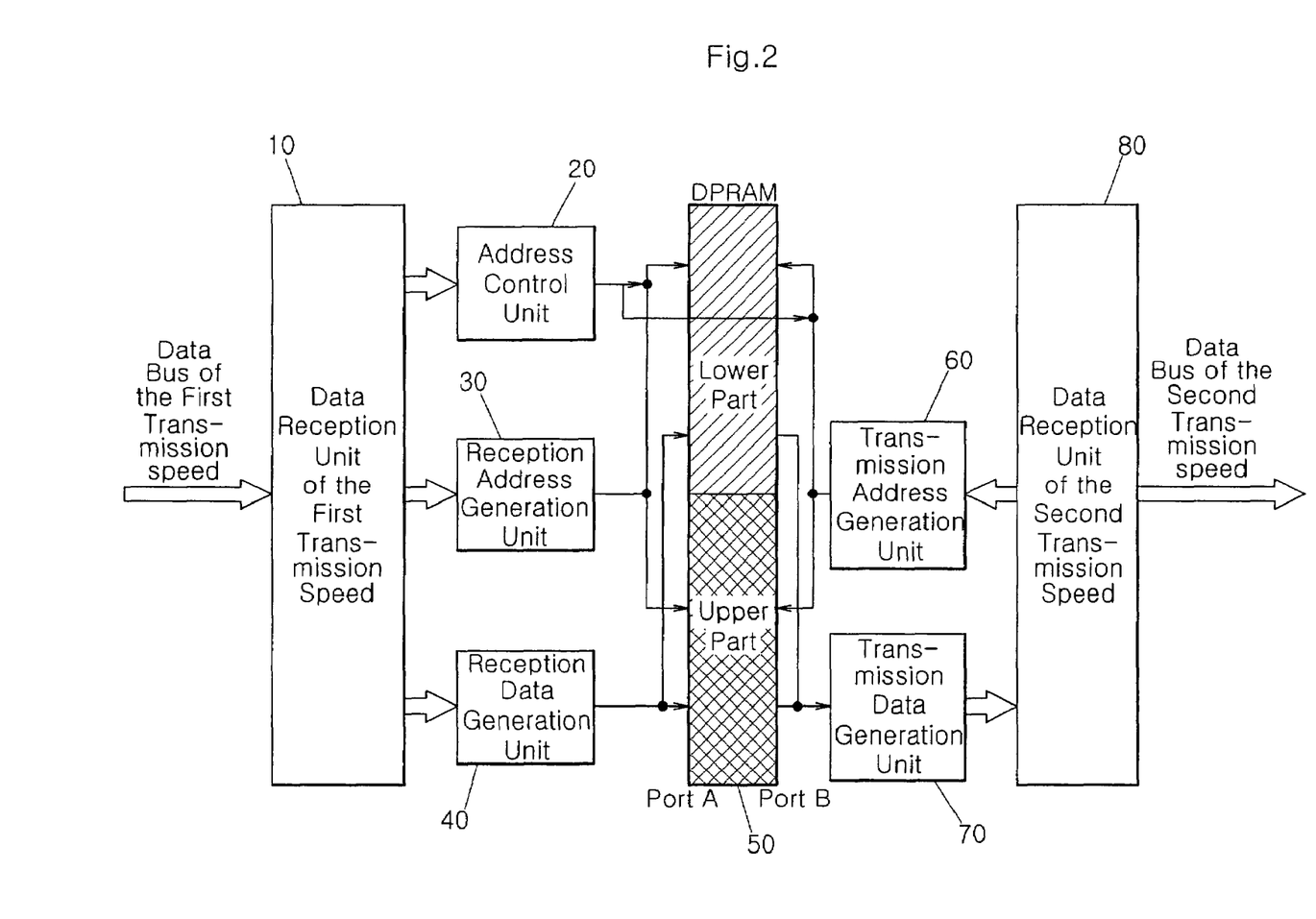
FIG. 2 is a block diagram that illustrates the apparatus for transforming data transmission speed according to a preferred embodiment of the present invention.

Referring to FIG. 2, the apparatus for transforming data transmission speed preferably includes a data reception unit of the first transmission speed 10, an address control unit 20, and a reception address generation unit 30. The apparatus further preferably includes a reception data generation unit 40, a DPRAM 50, a transmission address generation unit 60, a transmission data generation unit 70, and a data transmission unit of the second transmission speed 80.

Hereinafter, for the convenience of explanation, the preferred embodiment will be explained on the assumption that data are received from a data transmitting apparatus of the first transmission speed through a data bus of the first transmission speed, that the transmission speed of the relevant received data is transformed, and that the transformed data are transmitted to a data transmitting apparatus of the second transmission speed through a data bus of the second transmission speed. However, it should be noted that the description provided herein is not intended to be limiting, and other particular configurations could be applied.

The data reception unit of the first transmission speed 10 receives, from the data transmitting apparatus of the first transmission speed, serial data provided through the data bus of the first transmission speed by synchronizing the clock with a reference clock signal and the frame synchronizing signal. In each of the frames repeated through the data bus of the first transmission speed, data are distinguished for the relevant time slots and the required clock and reception data are extracted from the distinguished data.

The address control unit 20 controls the operation of writing or reading data in or from the DPRAM 50 by generating control signals other than the addresses required for writing data in the DPRAM 50 and the received data.

The reception address generation unit 30 preferably generates addresses for writing the received data in the DPRAM 50. The relevant addresses are generated by counting the respective time slots of the data bus of the first transmission speed based upon the frame synchronizing signal, which indicates the start of frames received through the data bus of the first transmission speed.

The reception data generation unit 40 preferably generates data to be written in the DPRAM 50 with the data received from the data reception unit of the first transmission speed 10. That is, the reception data generation unit 40 generates the data to be written in the DPRAM 50 by transforming serial data received for the respective time slots into parallel data.

The DPRAM 50 preferably stores the data generated by the reception data generation unit 40 and then outputs the data through the transmission data generation unit 70 to the data bus of the second transmission speed. That is, the DPRAM 50 stores the data received through the data bus of the first transmission speed and data to be transmitted through the data bus of the second transmission speed.

The transmission address generation unit 60 preferably generates addresses for reading data to be transmitted from the DPRAM 50. The relevant addresses are generated by counting the respective time slots of the data bus of the second transmission speed based upon the frame synchronizing signal that indicates the start of frames received through the data bus of the second transmission speed.

The transmission data generation unit 70 reads data from the DPRAM 50 and then preferably generates data to be transmitted through the data transmission unit of the second transmission speed 80 to the data bus of the second transmission speed. That is, the transmission data generation unit 70 reads from the DPRAM 50 the data to be transmitted to the data bus of the second transmission speed for the respective time slots.

The data transmission unit of the second transmission speed 80 transmits the data generated by the transmission data generation unit 70 through the data bus of the second transmission speed to the data transmitting apparatus of the second transmission speed in accordance with the transmission reference clock of the data bus of the second transmission speed and the frame synchronizing signal. That is, the data transmission unit of the second transmission speed 80 receives the necessary transmission reference clock and the frame synchronizing signal through the data bus of the second transmission speed, and transmits the relevant data to be transmitted for the respective time slots of the data bus of the second transmission speed.

The circuit composition of the apparatus for transforming data transmission speed according to the preferred embodiment of the present invention is preferably implemented in one of two ways. The first is by using a transmission speed transforming circuit unit including a DPRAM. The second is by using a transmission speed transforming circuit unit and a separate external DPRAM. Preferably, various control units except the DPRAM are implemented with transmission speed transforming circuit units, such as a Field Programmable Gate Array (FPGA).

Figure 4A:
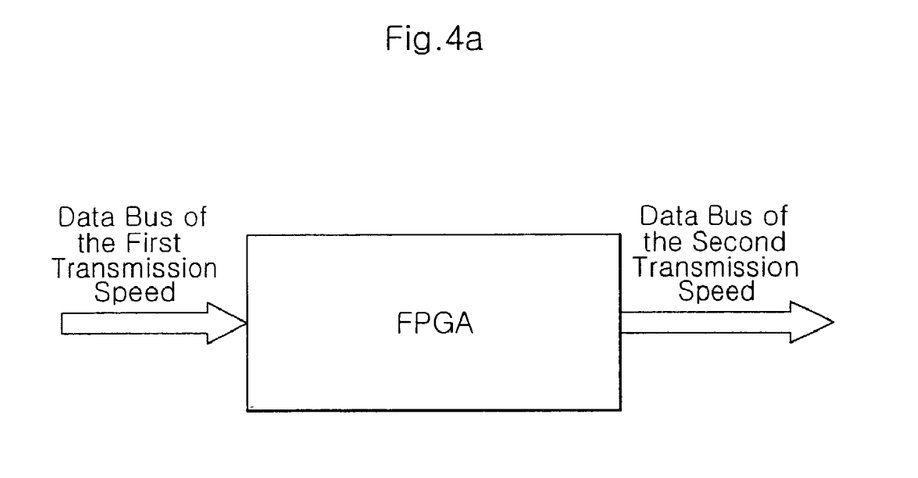
FIG. 4a illustrates an apparatus for transforming data transmission speed using Field Programmable Gate Arrays (FPGA) including DPRAM, according to one preferred embodiment of the present invention.

FIG. 4a illustrates an apparatus for transforming data transmission speed, according to one preferred embodiment of the present invention, using a transmission speed transforming circuit unit such as FPGA including the DPRAM.

As illustrated in FIG. 4a, the transmission speed transforming circuit unit receives data of the first transmission speed, through the relevant frame synchronizing signal of the data bus of the first transmission speed, by synchronizing the clock with the reference clock received through the data bus of the first transmission speed. The transforming circuit then stores the data at the internal DPRAM (not illustrated in the drawing), and transforms the stored data into data of the second transmission speed after reading the relevant stored data. Finally, the transforming circuit transmits the data of the second transmission speed through the frame synchronizing signal of the data bus of the second transmission speed by synchronizing the clock with the reference clock received through the data bus of the second transmission speed.

Figure 4B:
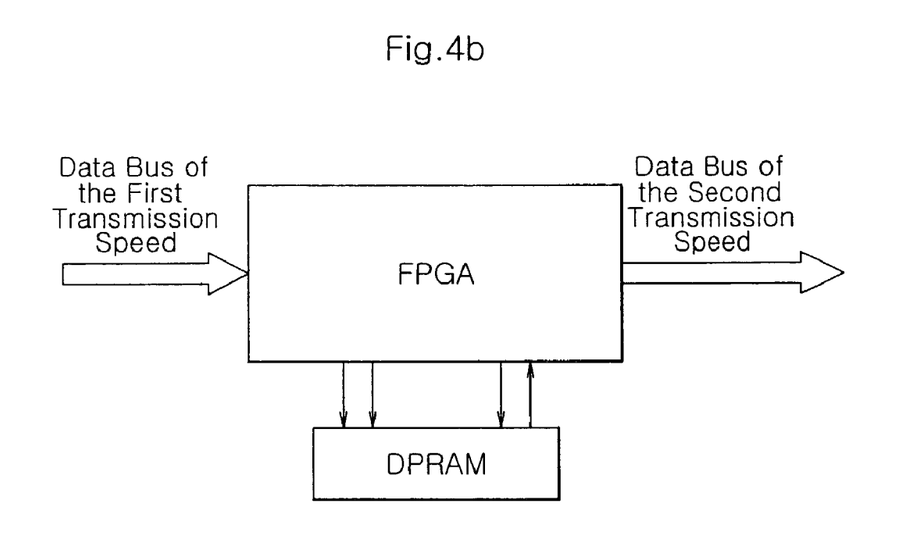
FIG. 4b illustrates an apparatus for transforming data transmission speed using DPRAM and FPGA according to another preferred embodiment of the present invention.

FIG. 4b illustrates an apparatus for transforming data transmission speed according to another preferred embodiment of the present invention, using a transmission speed transforming circuit unit such as FPGA and an external DPRAM.

As illustrated in FIG. 4b, the transmission speed transforming circuit unit receives and stores data of the first transmission speed, through the frame synchronizing signal of the data bus of the first transmission speed, by synchronizing the clock with the reference clock received through the data bus of the first transmission speed. The transformation circuit then reads and transmits the data of the second transmission speed and transmits the data through the frame synchronizing signal of the data bus of the second transmission speed, by synchronizing the clock with the reference clock received through the data bus of the second transmission speed. The DPRAM stores the data of the first transmission speed according to control of the transmission speed transforming circuit unit and outputs the data of the second transmission speed according to control of the transmission speed transforming circuit unit.

Also, although not illustrated in the drawings, the transmission speed transforming circuit unit may additionally comprise a data reception unit of the first transmission speed, a data transmission unit of the second transmission speed, an address control unit, a reception address generation unit, a reception data generation unit, a transmission address generation unit and a transmission data generation unit.

The data reception unit of the first transmission speed preferably receives data of the first transmission speed from the data transmitting apparatus of the first transmission speed through the frame synchronizing signal received through the data bus of the first transmission speed by synchronizing the clock with the reference clock received through the data bus of the first transmission speed.

The data transmission unit of the second transmission speed preferably transmits data of the second transmission speed to the data transmitting apparatus of the second transmission speed through the frame synchronizing signal received through the data bus of the second transmission speed by synchronizing the clock with the reference clock received through the data bus of the second transmission speed.

The address control unit preferably generates control signals for writing the data of the first transmission speed in the DPRAM and for reading the data of the second transmission speed from the DPRAM.

The reception address generation unit preferably generates addresses for writing the data of the first transmission speed into the DPRAM according to the control signals of the address control unit.

The reception data generation unit preferably transforms the data of the first transmission speed into data to be written into the DPRAM.

The transmission address generation unit preferably generates addresses for reading the data of the second transmission speed from the DPRAM according to the control signals of the address control unit.

The transmission data generation unit preferably transforms the data of the second transmission speed into the data to be transmitted through the data transmission unit of the second transmission speed.

An operation of an apparatus for transforming data transmission speed according to a preferred embodiment of the present invention will next be described.

First, the data transmitting apparatus of the first transmission speed synchronizes serial data with the reference clock and the frame synchronizing signal and transmits such serial data through the data bus of the first transmission speed to the data reception unit of the first transmission speed 10.

The data reception unit of the first transmission speed 10 next receives the serial data, synchronized with the reference clock and the frame synchronizing signal, from the data transmitting apparatus of the first transmission speed through the data bus of the first transmission speed. At this time, the data reception unit of the first transmission speed 10 extracts the required clock signal and the received data from the data bus of the first transmission speed.

Figure 3A:
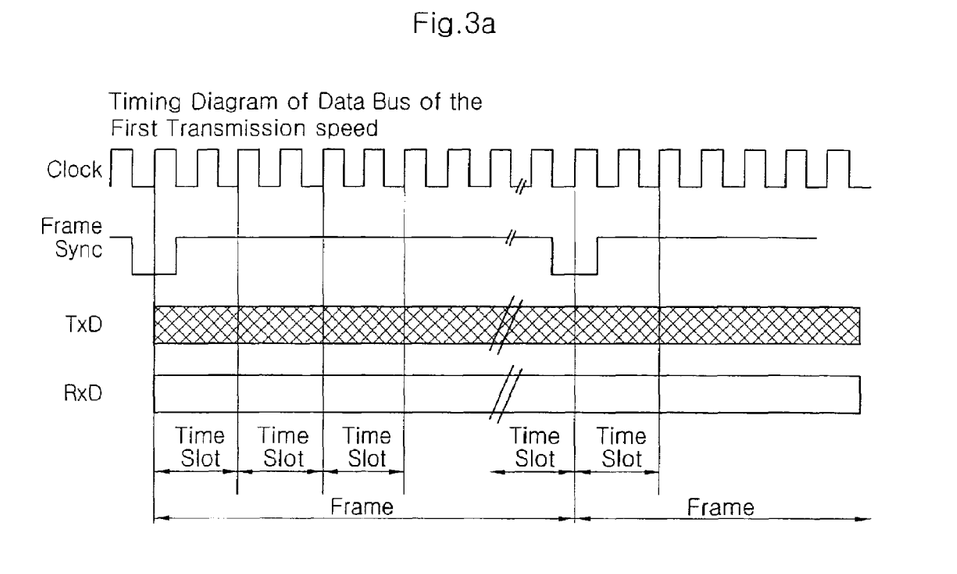
FIG. 3a illustrates the signal timing of the data bus of the first transmission speed illustrated in FIG. 2.

As illustrated in FIG. 3a, frames of the data bus of the first transmission speed are repeated in accordance with the respective frame synchronizing signals that indicate the start of each frame. The data in each frame are distinguished by a number of time slots. Accordingly, the data reception unit of the first transmission speed 10 extracts the reception data for the respective time slots from the repeated frames.

Thereafter, the address control unit 20, the reception address generation unit 30, and the reception data generation unit 40 generate addresses, control data, and other data to be written, which are required for writing the data received from the data reception unit of the first transmission speed in the DPRAM 50. The operation of writing the data in the relevant DPRAM 50 is thereby performed.

The address control unit 20 also generates control signals other than the addresses required for writing data in the DPRAM 50 and the received data.

The reception address generation unit 30 preferably generates addresses for writing the received data in the DPRAM 50 according to control signal of the address control unit 20. The relevant reception addresses are generated by counting the respective time slots of the data bus of the first transmission speed in accordance with the frame synchronizing signal that indicates the start of frames received through data bus of the first transmission speed.

Next, the reception data generation unit 40 preferably generates data to be written in the DPRAM 50. The data received through the data bus of the first transmission speed are serial data but data to be written in the DPRAM 50 should be parallel data. Thus, the serial data received for the respective time slots of the data bus of the first transmission speed are transformed into parallel data, to be written in the DPRAM 50.

The data to be written are generated upon extracting and converting the received serial data by counting the received clock for the respective time slots in accordance with the frame synchronizing signal.

Then, the DPRAM 50 preferably stores the data received through the data bus of the first transmission speed and performs the operation of storing data to be read through the data bus of the second transmission speed.

The data transmission unit of the second transmission speed 80 preferably receives the transmission reference clock and the frame synchronizing signal required for transmitting data to the data transmitting apparatus of the second transmission speed, and transmits the relevant data to be transmitted for the respective time slots of the data bus of the second transmission speed. In other words, the data transmission unit of the second transmission speed 80 transmits data of the second transmission speed by counting the reference clock of the relevant data bus of the second transmission speed for the respective time slots of the relevant data bus of the second transmission speed in the respective frames repeated in accordance with the frame synchronizing signal received through the relevant data bus of the second transmission speed.

The transmission address generation unit 60 preferably generates address of the DPRAM 50 required for reading data for the data bus of the second transmission speed from the DPRAM 50 according to the control signal of the address control unit 20.

Figure 3B:
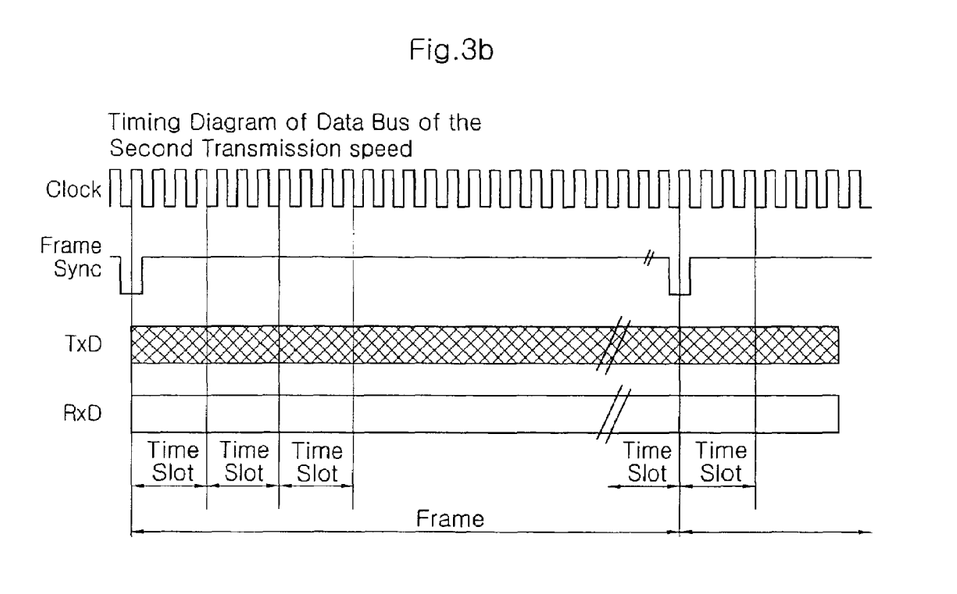
FIG. 3b illustrates the signal timing of the data bus of the second transmission speed illustrated in FIG. 2.

The address of the DPRAM 50 is generated by counting the respective time slots of the data bus of the second transmission speed in accordance with the frame synchronizing signals that indicates the start of frames received through the data bus of the second transmission speed, as illustrated in the timing diagram of FIG. 3b.

The transmission data generation unit 70 preferably reads from the DPRAM 50 the data to be transmitted to the data bus of the second transmission speed for the respective time slots, and transforms the parallel data read from the DPRAM 50 into serial data. The transformed serial data are transmitted to the data transmission unit of the second transmission speed 80 and the data transmission unit of the second transmission speed 80 transmits the data of the respective time slots through the data bus of the second transmission speed to the data transmitting apparatus of the second transmission speed.

For example, as shown in the timing diagrams of FIGS. 3a and FIG. 3b, the timing of the data bus of the second transmission speed is faster than the timing of the data bus of the first transmission speed.

As described above, the preferred embodiment uses the DPRAM 50 in order to transform data transmission speed. The DPRAM 50 may read from and write in the same address from two different ports, port A and port B as illustrated in FIG. 2. Thus, port A of the DPRAM 50 is made to write the data received from the data bus of the first transmission speed and port B of the DPRAM 50 is made to read the data to be transmitted to the data bus of the second transmission speed.

With the above-described structure of the DPRAM 50, the whole DPRAM 50 is operated as divided into the upper part and the lower part. The size of the DPRAM 50 is preferably determined so that both the upper part and the lower part may adequately store data of one frame.

Because the beginning of the frame synchronizing signals that indicate the start of the relevant frames would not be the same for the data bus of the first transmission speed and the data bus of the second transmission speed, if port A and port B of one DPRAM 50 access respectively, the access address in this case would be generated based upon the frame synchronizing signal of the relevant data bus. Thus, if port A and port B of the DPRAM 50 access the same address at the same time, the DPRAM 50 data for the relevant address may be lost.

To resolve the above-mentioned problem, the address control unit 20 controls the operation of accessing the DPRAM 50.

In other words, while the data reception unit of the first transmission speed is receiving one frame synchronizing signal, in order to prevent the reception address generation unit 30 and the transmission address generation unit 60 from accessing the same address of the DPRAM 50, the address control unit 20 controls the transmission address generation unit 60 so that it may access the upper part of the DPRAM 50 if the reception address generation unit 30 accesses the lower part of the DPRAM 50. Additionally, the address control unit 20 controls the transmission address generation unit 60 so that it may access the lower part of the DPRAM 50 if the reception address generation unit 30 accesses the upper part of the DPRAM 50. In this manner, the reception address generation unit 30 and the transmission address generation unit 60 are prevented from trying to simultaneously access the same address. Consequently, the data loss that may occur during the transmission speed transformation may be prevented.

On the other hand, the reverse transformation of the transmission speed from the data transmitting apparatus of the second transmission speed to the data transmitting apparatus the first transmission speed may be implemented by performing the above-mentioned operations in the reverse order.

The apparatus for transforming data transmission speed according to the preferred embodiment has many advantages. For example, by implementing the apparatus for transforming data transmission speed by using a DPRAM to transform transmission speeds of the relevant data of apparatuses for transmitting data that have different transmission speeds, the implementation of an apparatus for transforming data transmission speeds and the procedure of transforming data transmission speeds are made simpler. Furthermore, the data loss that may occur during the data transmission speed transformation may be prevented.

Figure 5:
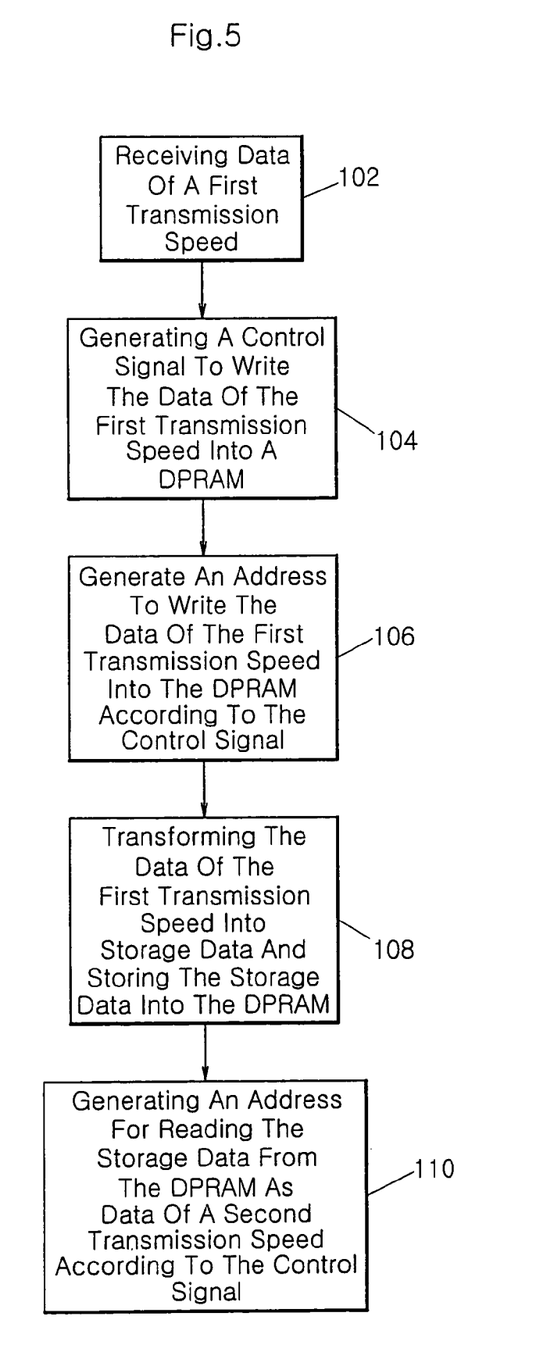
FIG. 5 illustrates a method of transforming data transmission speed between data transmitting apparatuses having different transmission speeds according to an embodiment of the present invention.

FIG. 5 illustrates a flow chart of a method of transforming data transmission speed between data transmitting apparatuses having different transmission speeds. This may include receiving data of a first transmission speed in block 102. This may further include generating a control signal to write the data of the first transmission speed into a Dual Port Random Access Memory (DPRAM) in block 104. Still further an address may be generated to write the data of the first transmission speed into the DPRAM according to the control signal in block 106. Additionally, the method may include transforming the data of the first transmission speed into storage data and storing the storage data into the DPRAM in block 108. The method may also generating an address for reading the storage data from the DPRAM as data of a second transmission speed according to the control signal in block 110.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for transforming data transmission speed, comprising:
   a transmission speed transforming circuit that receives data of a first transmission speed, through a first frame synchronizing signal of a first data bus of the first transmission speed, by synchronizing a first clock with a first reference clock of the first data bus; and
   a Dual Port Random Access Memory (DPRAM) coupled to receive and store the data from the transmission speed transforming circuit, wherein the transmission speed transforming circuit to read the stored data from the DPRAM and transmit the data with a second transmission speed, through a second frame synchronizing signal of a second data bus of the second transmission speed, by synchronizing a second clock with a second reference clock of the second data bus, wherein the transmission speed transforming circuit comprises:
   a data reception circuit that receives data of the first transmission speed through the first frame synchronizing signal by synchronizing the first clock of that data reception circuit with the first reference clock;
   a data transmission circuit that transmits data of the second transmission speed through the second frame synchronizing signal by synchronizing the second clock of the data transmission circuit with the second reference clock;
   an address control circuit that generates a control signal in order to write the data of the first transmission speed in the DPRAM and read the data of the second transmission speed from the DPRAM;
   a reception address generation circuit that generates addresses for writing the data of the first transmission speed in the DPRAM according to the control signal of the address control circuit;
   a reception data generation circuit that transforms the data of the first transmission speed into data to be written in the DPRAM;
   a transmission address generation circuit that generates addresses for reading the data of the second transmission speed from the DPRAM according to the control signal of the address control circuit; and
   a transmission data generation circuit that transforms the data of the second transmission speed into data to be transmitted by the data transmission circuit.

2. The apparatus of claim 1, wherein the DPRAM stores the data of the first transmission speed and the data of the second transmission speed.

3. The apparatus of claim 1, wherein the data reception circuit extracts the data of the first transmission speed from the respective frames repeated in accordance with the first frame synchronizing signal by counting the first reference clock for the respective time slots of the first data bus.

4. The apparatus of claim 1, wherein the reception address generation circuit generates addresses for writing the data of the first transmission speed in the DPRAM according to the control signal of the address control circuit by counting the respective time slots of the first data bus in accordance with the first frame synchronizing signal.

5. The apparatus of claim 1, wherein the reception data generation circuit transforms serial data received for the respective time slots of the first data bus into parallel data, and writes the parallel data in the DPRAM in accordance with the first frame synchronizing signal.

6. The apparatus of claim 1, wherein the data transmission circuit transmits data of the second transmission speed by counting the second reference clock for the respective time slots of the second data bus from the respective frames repeated in accordance with the second frame synchronizing signal.

7. The apparatus of claim 1, wherein the transmission address generation circuit generates addresses for reading the data of the second transmission speed from the DPRAM according to the control signal of the address control circuit by counting the respective time slots of the second data bus in accordance with the second frame synchronizing signal.

8. The apparatus of claim 1, wherein the transmission data generation circuit transforms parallel data read from the DPRAM into serial data, and transmits the serial data to the data transmission circuit.

9. The apparatus of claim 1, wherein the DPRAM comprises an upper part and a lower part, and a size of each of the upper part or lower part is enough to store data of at least one frame.

10. The apparatus of claim 9, wherein the address control circuit controls the address so that the transmission address generation circuit accesses the upper part of the DPRAM when the reception address generation circuit accesses the lower part of the DPRAM, or so that the transmission address generation circuit accesses the lower part of the DPRAM when the reception address generation circuit accesses the upper part of the DPRAM.

11. An apparatus for transforming data transmission speed, comprising:
a transmission speed transforming circuit that receives and stores data of a first transmission speed, through a first frame synchronizing signal of a first data bus, by synchronizing a clock with a first reference clock of the first data bus, and reads and transmits data of a second transmission speed, through a second frame synchronizing signal of a second data bus, by synchronizing the clock with a second reference clock of the second data bus; and
a Dual Port Random Access Memory coupled to receive and store the data of the first transmission speed according to the control of the transmission speed transforming circuit, and further to output the data of the second transmission speed according to the control of the transmission speed transforming circuit, wherein the transmission speed transforming circuit comprises:
a data reception circuit that receives data of the first transmission speed through the first frame synchronizing signal by synchronizing the clock with the first reference clock;
a data transmission circuit that transmits data of the second transmission speed through the second frame synchronizing signal by synchronizing the clock with the second reference clock;
an address control circuit that generates a control signal in order to write the data of the first transmission speed in the DPRAM and read the data of the second transmission speed from the DPRAM;
a reception address generation circuit that generates addresses for writing the data of the first transmission speed in the DPRAM according to the control signal of the address control circuit;
a reception data generation circuit that transforms the data of the first transmission speed into data to be written in the DPRAM;
a transmission address generation circuit that generates addresses for reading the data of the second transmission speed from the DPRAM according to the control signal of the address control circuit; and
a transmission data generation circuit that transforms the data of the second transmission speed into data to be transmitted by the data transmission circuit.

12. The apparatus of claim 11, wherein the first data bus operates at the first transmission speed and the second data bus operates at the second transmission speed.

13. An apparatus for transforming data transmission speed comprising:
a data reception circuit of a first transmission speed that receives data of the first transmission speed through a first frame synchronizing signal of a first data bus by synchronizing a clock with a first reference clock;
a data transmission circuit that transmits data of a second transmission speed through a second frame synchronizing signal of a second data bus by synchronizing the clock with a second reference clock;
a Dual Port Random Access Memory (DPRAM) that stores the data of the first transmission speed and the data of the second transmission speed;
an address control circuit that generates a control signal in order to write the data of the first transmission speed in the DPRAM and read the data of the second transmission speed from the DPRAM;
a reception address generation circuit that generates addresses for writing the data of the first transmission speed in the DPRAM according to the control signal of the address control circuit;
a reception data generation circuit that transforms the data of the first transmission speed into data to be written in the DPRAM;
a transmission address generation circuit that generates addresses for reading the data of the second transmission speed from the DPRAM according to the control signal of the address control circuit; and
a transmission data generation circuit that transforms the data of the second transmission speed into data to be transmitted by the data transmission circuit.

14. The apparatus of claim 13, wherein the data reception circuit extracts the data of the first transmission speed from the respective frames repeated in accordance with the first frame synchronizing signal by counting the first reference clock for the respective time slots of the first data bus.

15. The apparatus of claim 13, wherein the reception address generation circuit generates addresses for writing the data of the first transmission speed in the DPRAM according to the control signal of the address control circuit by counting the respective time slots of the first data bus in accordance with the first frame synchronizing signal.

16. The apparatus of claim 13, wherein the reception data generation circuit transforms serial data received for the respective time slots of the first data bus into parallel data, and writes the parallel data in the DPRAM in accordance with the first frame synchronizing signal.

17. The apparatus of claim 13, wherein the data transmission circuit transmits data of the second transmission speed by counting the second reference clock for the respective time slots of the second data bus from the respective frames repeated in accordance with the second frame synchronizing signal.

18. The apparatus of claim 13, wherein the transmission address generation circuit generates addresses for reading the data of the second transmission speed from the DPRAM according to the control signal of the address control circuit by counting the respective time slots of the second data bus in accordance with the second frame synchronizing signal.

19. The apparatus of claim 13, wherein the DPRAM comprises an upper part and a lower part, and a size of each of the upper part or the lower part is enough to store data of at least one frame.

20. The apparatus of claim 19, wherein the address control circuit controls the address so that the transmission address generation circuit accesses the upper part of the DPRAM when the reception address generation circuit accesses the lower part of the DPRAM, or so that the transmission address generation circuit accesses the lower part of the DPRAM when the reception address generation circuit accesses the upper part of the DPRAM.

* * * * *